US012809710B2

(12) United States Patent
McCurdy et al.

(10) Patent No.: US 12,809,710 B2
(45) Date of Patent: Nov. 24, 2026

(54) AUTOMATED DIAGNOSTIC PLAN GENERATION FOR TECHNICAL SUPPORT

(71) Applicant: Insight Direct USA, Inc., Chandler, AZ (US)

(72) Inventors: David McCurdy, Centennial, CO (US); Jason Rader, Jacksonville, FL (US)

(73) Assignee: Insight Direct USA, Inc., Chandler, AZ (US)

( * ) Notice: Subject to any disclaimer, the term of this patent is extended or adjusted under 35 U.S.C. 154(b) by 16 days.

(21) Appl. No.: 18/911,827

(22) Filed: Oct. 10, 2024

(65) Prior Publication Data

US 2025/0370846 A1 Dec. 4, 2025

Related U.S. Application Data

(60) Provisional application No. 63/655,934, filed on Jun. 4, 2024.

(51) Int. Cl.
*G06F 40/00* (2020.01)
*G06F 11/07* (2006.01)
(Continued)

(52) U.S. Cl.
CPC .......... *G06F 11/079* (2013.01); *G06F 16/243* (2019.01); *G06F 40/00* (2020.01);
(Continued)

(58) Field of Classification Search
CPC ........ G06F 11/079; G06F 40/30; G06F 40/00; G06F 16/243; G06F 11/0766; G06N 20/00
See application file for complete search history.

(56) References Cited

U.S. PATENT DOCUMENTS

| | | | |
|---|---|---|---|
| 6,571,236 | B1 | 5/2003 | Ruppelt |
| 6,826,500 | B2 | 11/2004 | Linthicum et al. |

(Continued)

FOREIGN PATENT DOCUMENTS

| | | | |
|---|---|---|---|
| AU | 2018220034 | B2 | 4/2019 |
| AU | 2023204006 | A1 | 7/2023 |

(Continued)

OTHER PUBLICATIONS

Zengliang Zhu, et al., "Retrieval-Augmented Generation for Knowledge-Intensive NLP Tasks" (Year: 2020).

*Primary Examiner* — Jonathan D Gibson
(74) *Attorney, Agent, or Firm* — Kinney & Lange, P.A.

(57) ABSTRACT

A method of hybrid technical support includes receiving, by a network-connected device, a first user prompt including at least one technical support query and generating, by a language model executed by the network-connected device, a first natural-language response to the first user prompt, the first natural-language response configured to elicit first additional information describing the at least one technical support query. The method further includes receiving, by the network-connected device, a second user prompt including the first additional information describing the at least one technical support query, generating a pre-summarization prompt based on the first user prompt and the second user prompt, generating a summarization of the pre-summarization prompt using a language summarization model executed by the network-connected device, and providing the summarization to a support technician device configured to be operated by a support technician. The language summarization model is configured to generate summaries of text prompts.

9 Claims, 3 Drawing Sheets

(51) Int. Cl.

| | |
|---|---|
| ***G06F 16/242*** | (2019.01) |
| ***G06F 40/20*** | (2020.01) |
| ***G06F 40/30*** | (2020.01) |
| *G06F 16/3329* | (2025.01) |
| *G06F 16/3332* | (2025.01) |
| *G06F 16/334* | (2025.01) |
| *G06F 16/9032* | (2019.01) |
| *G06F 40/40* | (2020.01) |
| *G06F 40/56* | (2020.01) |
| *G06N 20/00* | (2019.01) |

(52) U.S. Cl.

CPC .............. *G06F 40/20* (2020.01); *G06F 40/30* (2020.01); *G06F 11/0766* (2013.01); *G06F 11/0769* (2013.01); *G06F 16/3329* (2019.01); *G06F 16/3334* (2019.01); *G06F 16/3344* (2019.01); *G06F 16/90332* (2019.01); *G06F 40/40* (2020.01); *G06F 40/56* (2020.01); *G06N 20/00* (2019.01)

(56) References Cited

U.S. PATENT DOCUMENTS

| | | | |
|---|---|---|---|
| 7,373,300 | B1 | 5/2008 | Bangalore et al. |
| 7,409,318 | B2 * | 8/2008 | Dulberg .............. G06F 11/0748 702/182 |
| 7,542,971 | B2 | 6/2009 | Thione et al. |
| 7,778,837 | B2 | 8/2010 | Thiesson et al. |
| 7,788,126 | B2 | 8/2010 | Wagner et al. |
| 7,953,624 | B2 | 5/2011 | Kunnes |
| 8,291,319 | B2 | 10/2012 | Li et al. |
| 8,666,921 | B2 * | 3/2014 | Fisher, Jr. ...... G06Q 10/063112 706/46 |
| 8,904,295 | B2 | 12/2014 | Whalin et al. |
| 8,990,088 | B2 | 3/2015 | Morton et al. |
| 9,779,159 | B2 | 10/2017 | Buryak et al. |
| 10,049,102 | B2 | 8/2018 | Prasad et al. |
| 10,133,729 | B2 | 11/2018 | He et al. |
| 10,310,594 | B2 | 6/2019 | Gonsalves et al. |
| 10,586,532 | B1 | 3/2020 | Cavallo et al. |
| 10,747,559 | B2 | 8/2020 | Caldwell et al. |
| 10,938,678 | B2 * | 3/2021 | Ghosh ..................... G06F 40/30 |
| 11,005,786 | B2 | 5/2021 | Zhang et al. |
| 11,062,618 | B2 | 7/2021 | Baker et al. |
| 11,189,267 | B2 | 11/2021 | Cronin et al. |
| 11,325,002 | B2 | 5/2022 | Knight et al. |
| 11,327,722 | B1 | 5/2022 | Bahrami et al. |
| 11,373,044 | B2 | 6/2022 | Fox et al. |
| 11,386,358 | B2 | 7/2022 | Sheopuri et al. |
| 11,423,314 | B2 | 8/2022 | Podgorny et al. |
| 11,580,350 | B2 | 2/2023 | Wu |
| 11,631,039 | B2 | 4/2023 | Monnett et al. |
| 11,645,138 | B2 | 5/2023 | Mccawley et al. |
| 11,650,987 | B2 | 5/2023 | Bordawekar et al. |
| 11,657,102 | B2 | 5/2023 | Fowlkes et al. |
| 11,694,281 | B1 | 7/2023 | Liu et al. |
| 11,816,721 | B2 | 11/2023 | Ksyta et al. |
| 12,061,614 | B2 | 8/2024 | Lee |
| 2003/0083922 | A1 | 5/2003 | Reed |
| 2004/0100493 | A1 | 5/2004 | Reid et al. |
| 2005/0198299 | A1 | 9/2005 | Beck et al. |
| 2006/0047753 | A1 | 3/2006 | Pal |
| 2011/0145822 | A1 | 6/2011 | Rowe et al. |
| 2012/0059662 | A1 | 3/2012 | Huisman, Jr. |
| 2013/0041952 | A1 | 2/2013 | Silas et al. |
| 2013/0151893 | A1 * | 6/2013 | Gorecha ............. G06F 11/0793 714/15 |
| 2013/0173479 | A1 * | 7/2013 | Paz Salgado ........ G06Q 30/016 705/304 |
| 2013/0198092 | A1 | 8/2013 | Dugan et al. |
| 2014/0129536 | A1 * | 5/2014 | Anand .................. G06F 11/079 707/723 |
| 2016/0364250 | A1 * | 12/2016 | Seibert .................... G06F 9/453 |
| 2018/0033017 | A1 * | 2/2018 | Gopalakrishnan Iyer .................. G06N 5/043 |
| 2019/0005957 | A1 | 1/2019 | Yoon |
| 2019/0182383 | A1 | 6/2019 | Shaev et al. |
| 2019/0279159 | A1 * | 9/2019 | Cleaver ..................... G06F 8/65 |
| 2020/0034689 | A1 | 1/2020 | Andrassy et al. |
| 2020/0311738 | A1 | 10/2020 | Gupta et al. |
| 2021/0014136 | A1 | 1/2021 | Rath |
| 2021/0049063 | A1 * | 2/2021 | Reed ................... G06F 11/0793 |
| 2021/0089959 | A1 | 3/2021 | Ghosh et al. |
| 2021/0149964 | A1 | 5/2021 | Wang et al. |
| 2021/0157985 | A1 * | 5/2021 | Rotkop ................. G06F 40/205 |
| 2021/0174937 | A1 | 6/2021 | Swisher et al. |
| 2021/0304760 | A1 | 9/2021 | Chuang |
| 2021/0382923 | A1 | 12/2021 | Gragnani et al. |
| 2022/0027578 | A1 | 1/2022 | Chorakhalikar et al. |
| 2022/0101148 | A1 | 3/2022 | Lin et al. |
| 2022/0342738 | A1 * | 10/2022 | Samuel ................. G06F 11/079 |
| 2022/0343233 | A1 | 10/2022 | Selka et al. |
| 2023/0206692 | A1 | 6/2023 | Saxena et al. |
| 2023/0222511 | A1 | 7/2023 | Baghdasaryan et al. |
| 2023/0259692 | A1 | 8/2023 | Wright |
| 2024/0169361 | A1 | 5/2024 | Mcnamara et al. |
| 2024/0323490 | A1 | 9/2024 | Ni et al. |
| 2024/0345911 | A1 * | 10/2024 | Bellam ............... G06F 11/0709 |
| 2024/0394485 | A1 * | 11/2024 | Betteridge ............ G06F 40/263 |
| 2025/0006196 | A1 * | 1/2025 | Wang ...................... G06F 40/30 |
| 2025/0053743 | A1 * | 2/2025 | Rader ..................... G06F 40/30 |
| 2025/0117414 | A1 * | 4/2025 | McCurdy ............ G06F 16/3329 |
| 2025/0117421 | A1 * | 4/2025 | McCurdy ............ G06F 16/3329 |
| 2025/0148477 | A1 * | 5/2025 | Mehrotra ............... G06Q 10/20 |
| 2025/0209122 | A1 * | 6/2025 | Mortensen ........... G06N 3/0475 |
| 2025/0244975 | A1 * | 7/2025 | Lingelbach ............... G06F 8/38 |
| 2025/0252293 | A1 * | 8/2025 | Lo ............................ G06N 3/10 |
| 2025/0334963 | A1 * | 10/2025 | Maturana ........... G05B 23/0272 |
| 2025/0370846 | A1 * | 12/2025 | McCurdy .............. G06F 11/079 |
| 2025/0370853 | A1 * | 12/2025 | McCurdy ............ G06F 11/0793 |

FOREIGN PATENT DOCUMENTS

| | | | |
|---|---|---|---|
| CA | 3042921 | A1 | 11/2019 |
| EP | 3977392 | A1 | 4/2022 |
| IN | 201647029607 | A | 10/2016 |
| WO | 2019113122 | A1 | 6/2019 |
| WO | 2022079107 | A1 | 4/2022 |

* cited by examiner

AUTOMATED DIAGNOSTIC PLAN GENERATION FOR TECHNICAL SUPPORT

CROSS-REFERENCE TO RELATED APPLICATION

This application is a nonprovisional application claiming the benefit of U.S. provisional Ser. No. 63/655,934, filed on Jun. 4, 2024, entitled “AUTOMATED DIAGNOSTIC PLAN GENERATION FOR TECHNICAL SUPPORT” by D. McCurdy and J. Rader.

FIELD OF THE INVENTION

The present disclosure relates to technical support and, more particularly, systems and the automated generation of diagnostic plans for use in technical support.

BACKGROUND

Generative artificial intelligence (AI) language models, such as large language models and/or transformer models, are capable of dynamically generating content based on user prompts. Human-generated prompts can be augmented with additional information to provide context to the language model and improve the accuracy and/or relevance of natural-language generated by the model in response to a prompt.

A support technician providing customer and user technical support typically needs to diagnose a user's technical problem(s) before the support technician is able to create a plan to resolve the user's technical problem. Users in need of technical support for a technical problem are often unable to independently diagnose the technical problem for which they are seeking technical support, requiring technical support agents to perform diagnostic tasks prior to resolving user technical problems.

SUMMARY

The present disclosure provides a method of hybrid technical support that includes receiving, by a network-connected device, a first user prompt including at least one technical support query and generating, by a language model executed by the network-connected device, a first natural-language response to the first user prompt, the first natural-language response configured to elicit first additional information describing the at least one technical support query. This method further includes receiving, by the network-connected device, a second user prompt including the first additional information describing the at least one technical support query, generating a pre-summarization prompt based on the first user prompt and the second user prompt, generating a summarization of the pre-summarization prompt using a language summarization model executed by the network-connected device, and providing the summarization to a support technician device configured to be operated by a support technician. The language summarization model is configured to generate summaries of text prompts.

The present disclosure also provides a system for technical support. The system includes a user device, a technical support agent device, a database, and a server, all of which are electronically connected to the network. The server includes a processor and at least one memory. The memory is encoded with instructions that, when executed, cause the processor to receive a natural-language prompt from the user device and a user identifier corresponding to the user. The natural-language prompt includes a natural-language description of a symptom of a technical problem. The instructions, when executed, also cause the processor to query the database with a first query including at least one of the user identifier, a representation of the natural-language prompt, and at least one keyword extracted from the natural-language prompt, and then to receive information from the first database in response to the first query, and to generate, using a machine-learning language model, a natural-language diagnostic plan based on the augmented prompt, the natural-language diagnostic plan comprising a plurality of diagnostic steps for diagnosing the technical problem, and transmit the natural-language diagnostic plan to a technical support agent device in electronic communication with the user device.

The present summary is provided only by way of example, and not limitation. Other aspects of the present disclosure will be appreciated in view of the entirety of the present disclosure, including the entire text, claims, and accompanying figures.

Figure 1:
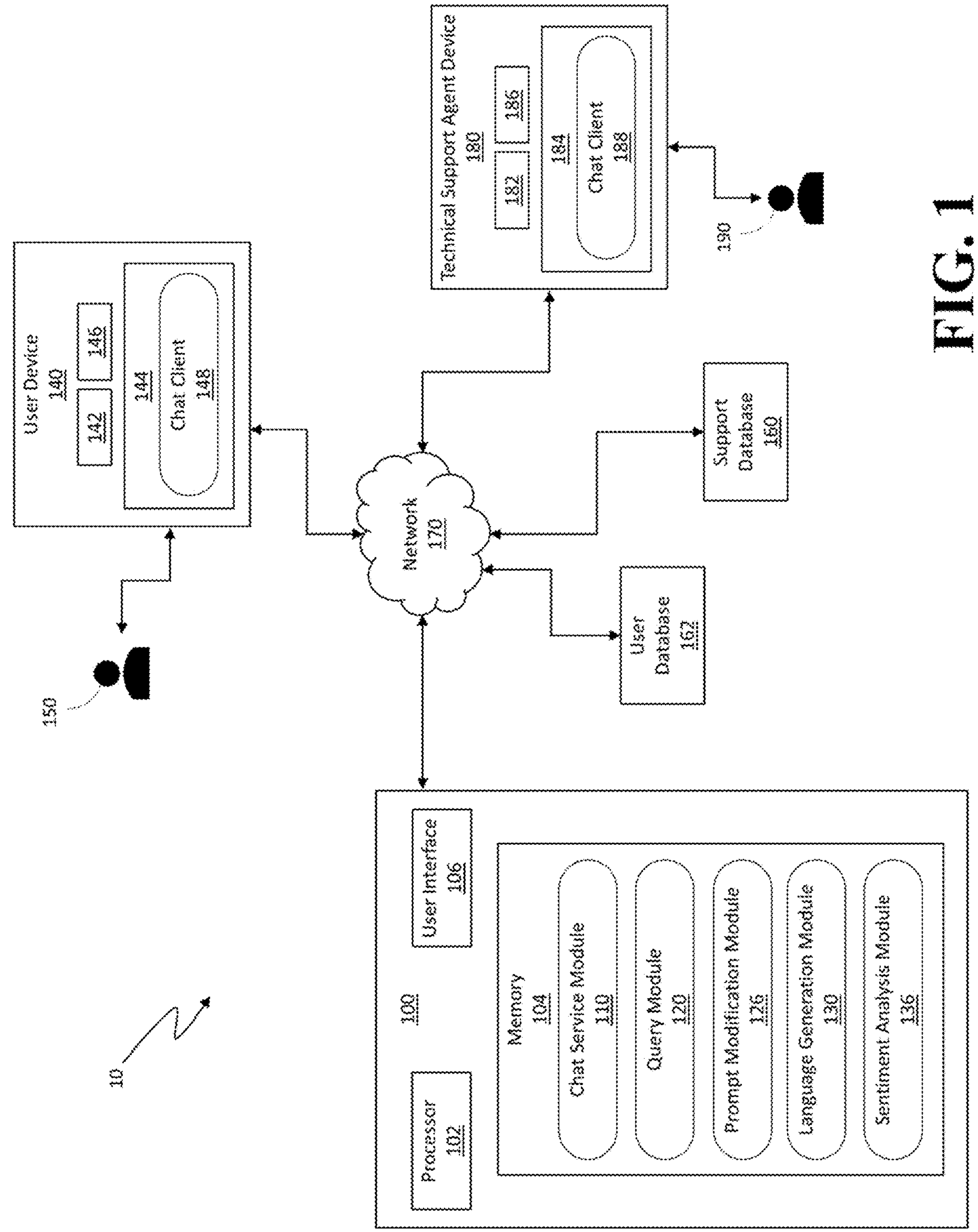
FIG. 1 is a schematic diagram of an example of a system for providing technical support using automatedly-generated diagnostic plans.

While the above-identified figures set forth one or more examples of the present disclosure, other examples are also contemplated, as noted in the discussion. In all cases, this disclosure presents the invention by way of representation and not limitation. It should be understood that numerous other modifications and examples can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The present disclosure relates to systems and methods for automated diagnostic plan generation for use in technical support and, further, the use of machine-learning language models for automated diagnostic plan generation. As will be explained in more detail subsequently, the systems and methods disclosed herein enable automated generation of diagnostic plans that can be used to diagnose and, in some examples, also resolve user technical issues. The systems and methods disclosed herein improve the accuracy and efficiency with which technical support agents are able to resolve user technical issues and, further, can reduce the technical training and experience required for technical support agents to accurately and efficiently resolve user technical issues.

FIG. 1 is a schematic depiction of technical support system 10, which is a system for providing hybrid technical support. Technical support system 10 includes server 100, user device 140, support database 160, user database 162, network 170, and technical support agent device 180. Server 100 includes processor 102, memory 104, and user interface 106. Memory 104 stores chat service module 110, query module 120, prompt modification module 126, language generation module 130, and sentiment analysis module 136. User device 140 includes processor 142, memory 144, and user interface 146. Technical support agent device 180 includes processor 182, memory 184, and user interface 186. Memory 144 and memory 184 store chat client 148 and chat client 188, respectively. FIG. 1 also depicts user 150 and support technician 190.

Server 100 is configured to automatedly generate diagnostic plans for diagnosing user technical problems and, in some examples, for resolving the user's problem based on a user's initial message to a technical support chat service. More specifically, server 100 is able to automatedly generate one or more queries of support database 160 and, further, to generate natural language using a machine-learning language model based on the user's initial message (including any natural-language descriptions of symptoms of the user's technical support issue) and, in some examples, based on user-specific information known to or otherwise accessible by the operator of the technical support chat service. Advantageously, diagnostic plans generated by server 100 can be followed by technical support agents during support sessions with users of the technical support chat service to accurately and efficiently diagnose and, in some examples, resolve user technical problems.

Server 100 is a network-connected device that is connected to network 170 and is configured to operate a technical support chat service accessible to users via network 170. In particular, server 100 is configured to perform automated technical support of user technical issues and is able to generate natural-language responsive to user technical issues. While server 100 is discussed generally herein a single physical device, in at least some examples, server 100 can be a virtual device, server, etc. virtualized on a single device or across any suitable number of devices.

As used herein, "automated technical support" or "automated support" refers to technical support provided to a user using one or more automated natural-language messages generated by server 100 or another suitable computing device. Conversely, as used herein, "human-mediated technical support" or "human-mediated support" refers to technical support provided to a user by a human technical support technician. Server 100 is generally configured to perform tasks related to human-mediated technical support, but in other examples, server 100 can also be configured to perform automated technical support. Server 100 includes or more hardware elements, devices, etc. for facilitating electronic communication with network 170 via one or more wired and/or wireless connections. Server 100 is able to communicate with user device 140 via network 170. Although server 100 is generally referred to herein as a server, server 100 can be any suitable network-connectable computing device for performing the functions of server 100 detailed herein.

Processor 102 can execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is configured to store information and, in some examples, can be described as a computer-readable storage medium. Memory 104, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is a temporary memory. As used herein, a temporary memory refers to a memory having a primary purpose that is not long-term storage. Memory 104, in some examples, is described as volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. The memory, in one example, is used by software or applications running on server 100 (e.g., by a computer-implemented machine-learning model or a data processing module) to temporarily store information during program execution.

Memory 104, in some examples, also includes one or more computer-readable storage media configured to store larger amounts of information than volatile memory. Memory 104 can further be configured for long-term storage of information. In some examples, memory 104 includes non-volatile storage elements. Examples of such non-volatile storage elements can include, for example, magnetic hard discs, optical discs, floppy discs, flash memories, and/or forms of electrically programmable memories (EPROM) and/or electrically erasable and programmable (EEPROM) memories (e.g., flash memory).

User interface 106 is an input and/or output device and/or software interface, and enables an operator to control operation of and/or interact with software elements of server 100. For example, user interface 106 can be configured to receive inputs from an operator and/or provide outputs. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

In some examples, server 100 can operate an application programming interface (API) (e.g., as a software component of user interface or as another software component of server 100) for facilitating communication between server 100 and other devices connected to network 170 as well as for allowing devices connected to network 170 to access functionality of server 100. A device connected to network 170, such as user device 140 or technical support agent device 180, can send a request to an API operated by server 100 to, for example, generate language in response to user technical queries.

User device 140 is an electronic device that a user (e.g., user 199) can use to access network 170 and functionality of server 100 (i.e., via network 170). User device 140 includes processor 142, memory 144, and user interface 146, which are substantially similar to processor 102, memory 104, and user interface 106, respectively, and the discussion herein of processor 102, memory 104, and user interface 106 is applicable to processor 142, memory 144, and user interface 146, respectively. User device 140 includes networking capability for sending and receiving data transmissions via network 170 and can be, for example, a personal computer or any other suitable electronic device for performing the functions of user device 140 detailed herein. Memory 144 stores software elements of chat application 148, which will be discussed in more detail subsequently and particularly with respect to the function of chat service module 110 of server 100.

Support database 160 is an electronic database connected to network 170 and accessible by server 100. Support database 160 includes machine-readable data storage capable of retrievably housing stored data, such as database or application data. In some examples, support database 160 includes long-term non-volatile storage media, such as magnetic hard discs, optical discs, flash memories and other forms of solid-state memory, or forms of electrically programmable memories (EPROM) or electrically erasable and programmable (EEPROM) memories. Support database 160 can include a processor, at least one memory, and a user interface that are substantially similar to processor 102, memory 104, and user interface 106 of server 100. Support database 160 stores diagnostic templates, such as diagnostic checklists, troubleshooting guides, transcripts of successful technical support sessions, or other materials that can be used to generate a diagnostic plan to diagnose user technical problems based on user-provided symptoms of technical problems. The diagnostic templates stored to support database 160 include natural-language text that can be recognized and used as at least part of an input to a language mode of language generation module 130 (discussed subsequently).

Support database 160 can be a structured database (e.g., a table or relational database) or a semi-structured database (e.g., a hierarchical and/or nested database), and, in at least some examples, support database 160 can be a relational database. In at least some examples, support database 160 can include one or more relational databases or tables can include pointers to natural-language diagnostic templates. Server 100 can query support database 160 with user identifiers, product information, keywords obtained from user prompts provided via chat client 148, or a combination thereof, to select a diagnostic template that is responsive or likely to be responsive to a user technical problem. For example, product information can be used to select a subset of entries of a relational table maintained by support database 160. One or more keywords extracted from a user message or prompt including symptoms of the user's technical problem can be used to select one or more diagnostic templates usable to generate instructions for a technical support agent using language generation module 130. In further examples, support database 160 can include one or more software search modules configured to search data stored to support database 160 with keywords provided by query module 120. In these examples, support database 160 can operate and expose an API to allow query module 120 to access keyword search functionality.

Support database 160 can also be or include a vector database (i.e., an electronic database that stores vector information representative of natural-language text). The vectors can be vector embeddings created using an embedding model/algorithm that transforms natural-language text into vectors representative of the text. The vectors can represent the words of the natural-language text (e.g., word vectors) and/or any other suitable element of the text, and further can represent any suitable length of text, such as sentences, paragraphs, etc. A user prompt or message including symptoms of the user technical query can be converted to a vector embedding using the same embedding model/algorithm used to create the vectors of the vector database. The resultant vector can be referred to as a "query vector" and the vectors of the database can be referred to as "database vectors." The vector database can be queried by comparing the similarity of the query vector to the database vectors using any suitable vector comparison method, such as cosine similarity, cartesian similarity, and/or any other suitable test for assessing vector similarity. Database vectors having a similarity score above a particular threshold and/or having the highest overall similarity to the query vector can be returned in response to the query. The corresponding diagnostic template(s) (i.e., the raw text information of the corresponding diagnostic template(s)) represented by the returned vectors can then be retrieved and provided to server 100.

User database 162 is an electronic database that is directly connected to server 100 and/or is connected to server 100 via a local network. User database 162 includes machine-readable data storage capable of retrievably housing stored data, such as database or application data. In some examples, user database 162 includes long-term non-volatile storage media, such as magnetic hard discs, optical discs, flash memories and other forms of solid-state memory, or forms of electrically programmable memories (EPROM) or electrically erasable and programmable (EEPROM) memories. User database 162 includes a processor, at least one memory, and a user interface that are substantially similar to processor 102, memory 104, and user interface 106 of server 100. User database 162 can organize data using a database management system (DBMS) and can be a structured database (e.g., a table or relational database) or a semi-structured database (e.g., a hierarchical and/or nested database). In at least some examples, user database 162 is a relational database. User database 162 can be configured to be queryable using user identifiers, such as user credentials (e.g., credentials for accessing server 100 functionality, such as a username or password), account numbers, loyalty numbers, and/or other suitable user descriptors to retrieve stored user-specific information.

User database 162 stores data describing users who access server 100 and the software modules thereof (e.g., user 150). User database 162 can store, for example, descriptive user information, such as user purchase history, user device information, or another suitable type of information for describing a user. Information retrieved from user database 162 can be used to query support database 160 or can be used to augment natural-language prompts provided to language generation module 130 (e.g., via prompt modification module 126). When user information is updated in user database 162 and/or user performs an action suitable for documentation, such as purchasing a product, purchasing a service, upgrading a product, upgrading a service level, etc., user database 162 can be updated to associate an identifier and/or a natural-language description of the product, service, etc. with an identifier for the user (e.g., the user's account name, account number, etc.).

While support database 160 and user database 162 are each discussed generally herein as physical devices, in at least some examples, each of support database 160 and user database 162 can be a virtual device, server, etc. virtualized on a single device or across any suitable number of devices. Further, while server 100, support database 160, and user database 162 are discussed generally herein as separate devices, in at least some examples, any combination of server 100, support database 160, and user database 162 can be virtualized on a single device or across a shared pool of devices.

Network 170 is a network suitable for connecting and facilitating network communication between server 100, user device 140, support database 160, user database 162, and technical support agent device 180. Network 170 can include any suitable combination of local network and wide area network (WAN) elements or components to connect server 100, user device 140, support database 160, user database 162, and technical support agent device 180. In some examples, the wide area network can be or include the Internet. For example, server 100 can be connected support database 160, user database 162, and technical support agent device 180 via a local network and server 100 can be connected to user device 140 via a WAN. As a further example, server 100 can be connected to all of user device 140, support database 160, user database 162, and technical support agent device 180 via a WAN (e.g., the Internet). In yet further examples, server 100 can be connected to some of support database 160, user database 162, and technical support agent device 180 via a WAN and others of support database 160, user database 162, and technical support agent device 180 via a local network and/or one or more local connections. As a specific example, server 100 can be connected to support database 160 and user database 162 via a local network and to technical support agent device 180 via a WAN.

Technical support agent device 180 is an electronic device accessible by a support technician, such as support technician 190. Technical support agent device 180 includes processor 182, memory 184, and user interface 186, which are substantially similar to processor 102, memory 104, and user interface 106, respectively, and the discussion herein of processor 102, memory 104, and user interface 106 is applicable to processor 182, memory 184, and user interface 186, respectively. Technical support agent device 180 includes networking capability for sending and receiving data transmissions via network 170 and/or via a direct and/or local connection to server 100. Technical support agent device 180 can be, for example, a personal computer or any other suitable electronic device for performing the functions of technical support agent device 180 detailed herein. Memory 184 stores software elements of chat client 188, which will be discussed in more detail subsequently and particularly with respect to the function of chat service module 110 of server 100. Technical support agent device 180 can be directly- and/or locally-connected to server 100 in examples where technical support agent device 180 is on-site (i.e., at the same facility, campus, etc. as server 100). In other examples, technical support agent device 180 is not co-located with server 100, technical support agent device 180 can be connected to server 100 via one or more WAN elements of network 170. (e.g., the Internet).

Chat service module 110 is a software module of server 100 and includes one or more programs for running a technical support chat service. The technical support chat service operated by chat service module 110 is accessible by chat clients 148, 188 and enables users to receive machine-generated natural-language text replies to user-generated text prompts. Chat service module 110 runs services used and/or invoked by chat clients 148, 188 and, further, provides initial user-generated prompts or messages provided by chat client 148 to query module 120, prompt modification module 126, and sentiment analysis module 136. Chat service module 110 is also able to provide diagnostic plans generated using language generation module 130 too technical support agent device 180 and, further, to relay subsequent messages between user device 140 and technical support agent device 180 (i.e., between chat client 148 and chat client 188, respectively).

Chat clients 148, 188 are software applications that are able to provide messages to server 100 and to receive responses from server 100. Chat clients 148, 188 can be, in some examples, web browsers for accessing a web application hosted by server 100 that uses the functionality of chat service module 110. Additionally and/or alternatively, chat clients 148, 188 can be specialized software applications for interacting with chat service module 110 of server 100. In some examples, chat client 148 can be a web application and chat client 188 can be a specialized software application that provides additional tools, resources, etc. to the support technician. Chat clients 148, 188 are configured to receive natural-language text messages and transmit those messages to server 100 for use by chat service module 110.

A user can initiate a new technical support session by interacting with chat client 148 to submit an initial prompt or query that includes one or more symptoms of the user's technical problem. For example, a user can submit an initial prompt or message that states: "My computer is crashing sometimes when I play back video." As will be explained in more detail subsequently, the programs of query module 120, prompt modification module 126, and language generation module 130 (and, optionally, sentiment analysis module 136) can be used to generate a diagnostic plan that can be transmitted to technical support agent device 180 and provided to a technical support agent (e.g., technical support agent 190) along with the user's initial prompt or message via chat client 188. Query module 120, prompt modification module 126, and language generation module 130 (and, optionally, sentiment analysis module 136) can also optionally be used to generate new diagnostic plans based on additional user messages, such as in examples where an initial diagnostic plan is unable to diagnose and/or resolve the user's technical issue(s).

The technical support agent (e.g., technical support agent 190) and the user (e.g., user 150) can exchange further messages using chat client 188 and chat client 148, respectively, in which the technical support agent can attempt to resolve the user's technical problem. The technical support agent can structure diagnostic questions posed to the user and, in some examples, initial troubleshooting steps according to the diagnostic plan generated by query module 120, prompt modification module 126, and language generation module 130 (and, optionally, sentiment analysis module 136).

Query module 120 is another software module of server 100 and includes one or more programs for generating queries for and performing queries of support database 160 and user database 162. Query module 120 can generate queries for support database 160 and user database 162 based on user-submitted prompts that include symptoms of technical questions. Query module 120 can extract one or more relevant keywords related to the user's technical problem and/or the symptoms thereof from the user's prompt and/or can generate an embedding or representation (e.g., a vector embedding) of the user's prompt to generate a query for support database 160. Query module 120 can extract keywords by, for example, using a natural-language processing algorithm to extract one or more intents and/or entities from the user's prompt or message. Query module 120 can then query support database 160 to retrieve one or more diagnostic templates that can be used to form a diagnostic plan by the language model(s) of language generation module 130.

Query module 120 can, for example, use a natural-language processing algorithm to extract multiple intents and/or entities from a user-submitted prompt. Each intent and/or entity can be used to retrieve separate diagnostic templates that can be synthesized into a diagnostic plan for use by a technical support agent by language generation module 130. In other examples, one or more intents or entities can be used to narrow the search space of support database 160 to a subset of data stored to support database 160 and other intent and/or entity information extracted from the user-submitted prompt can be used to select one or more diagnostic templates from the subset of data.

The messages from a user handled by chat service module 110 can also contain a user identifier linked to the user's identity. for example, an account name, an access credential (e.g., a username), an account number, the user's personal name (e.g., a first and/or last name), etc. Query module 120 can use user access credentials to retrieve user-specific information from user database 162 that can be used during language generation by language generation module 130 and/or can be used to query support database 160. As a specific example, query module 120 can query user database 162 to retrieve information describing a product recently purchased by the user, such as a name, model, manufacturer, or any other suitable information describing the product. The product information can be used to narrow the search space of support database 160 and the user's prompt can be used to retrieve one or more diagnostic templates from the resultant subset of data stored to support database 160 (e.g., via a vector-based search, a keyword search using a keyword extracted from the user's prompt, etc.).

Prompt modification module 126 is a software module of server 100 and includes one or more programs for modifying or augmenting user-submitted prompts with information generated using the other modules of server 100. In particular, prompt modification module modifies the user-submitted prompt to include information retrieved by query module 120 and, in some examples, one or more instructions for a language model of language generation module 130. For example, prompt modification module 126 can generate an augmented or modified prompt including instructions to a machine-learning language model to synthesize the retrieved information into a diagnostic plan. Prompt modification module 126 can also modify the prompt to include sentiment information generated using sentiment analysis module 136. The modified prompts generated by prompt modification module 126 are referred to herein as "augmented prompts" and are formatted and otherwise structured to be used as inputs for a language model of language generation module 130.

Language generation module 130 is a software module of server 100 and includes one or more programs for automated natural-language text generation. Language generation module 130 includes one or more computer-implemented machine-learning language models configured to generate natural-language outputs (or indications thereof) based on the augmented prompts generated by prompt modification module 126. The natural-language outputs generated by language generation module 130 include diagnostic plans for diagnosing the user technical problems that are performable by a technical support agent (e.g., technical support agent 190). The machine learning language model(s) can include one or more of a large language model or a transformer model, among other options. In some examples, the language model(s) are one or more general-purpose language models. In these examples, prompt modification module 126 can generate an augmented prompt that includes specific directions or instructions to generate a diagnostic plan. In yet further examples, the language model(s) can be customized to generate a diagnostic plan by training a language model to generate diagnostic plans or fine-tuning (e.g., via a transfer learning approach) a pre-trained language model to output diagnostic plans and/or to generate language useful for technical problem diagnosis. In these examples, the machine-learning language model may be able to generate a diagnostic plan from an augmented prompt that does not include specific instructions to generate a diagnostic plan. Language generation module 130 can provide generated diagnostic plans to chat service module 110 to be transmitted to relevant technical support agents handling user technical inquiries.

Each diagnostic plan generated by language generation module 130 can take any suitable form, structure, etc. to outline a strategy or identify one or more actions by which a technical support agent (e.g., technical support agent 190) can diagnose and, in some examples, resolve or attempt to resolve the user technical issue(s) outlined in the user message used to generate the diagnostic plan. For example, a diagnostic plan generated by language generation module 130 can be a checklist of troubleshooting tasks, including descriptions of likely technical issues or problems that may be indicated by each task. A diagnostic plan generated by language generation module 130 can also be, for example, an ordered series of questions and descriptions of likely technical issues corresponding to expected answers to the questions, such that a technical support agent can diagnose the user technical issue by asking the questions of the user (e.g., via the chat service operated by chat service module 110). A diagnostic plan generated by language generation module 130 can further take the form of a branching decision tree, with instructions as to troubleshooting tasks and/or questions for the user that can be followed by a technical support agent to diagnose and/or resolve the user's technical issue(s). A diagnostic plan generated by language generation module 130 can also be, for example, a ranked series of diagnostic steps arranged in a list (e.g., a bulleted or numbered list) or one or more natural-language sentences, paragraphs, etc.

The form, structure, etc. of the diagnostic plans can be determined by, for example, the templates retrieved by query module 120. In these examples, the form, structure, etc. of each diagnostic plan can vary. Additionally and/or alternatively, the form, structure, etc. of the diagnostic plans can be determined, in whole or in part, by the machine-learning language model(s) used by language generation module 130. For example, a machine-learning language model used for diagnostic plan generation can be trained or fine-tuned to preferentially generate diagnostic plans in a particular form, structure, etc. In these examples, the degree to which the form, structure, etc. of a diagnostic plan is based on the form, structure, etc. of the diagnostic template(s) retrieved by query module 120 can be determined by the parameters, hyperparameters, etc. of the machine-learning language model.

Sentiment analysis module 136 is a software module and includes one or more computer-implemented machine-learning models for performing sentiment analysis of user prompts used to generate diagnostic plans. The diagnostic plans generated from information retrieved using query module 120 include technical information for resolving user technical problems, but do not include predictions of likely user sentiment or suggestions that can be used by a technical support agent (e.g., technical support agent 190) to improve user experience based on predicted user sentiment. Sentiment analysis module 136 is an optional component of server 100 and is included on server 100 in examples where it is advantageous to provide sentiment information to the technical support agent tasked with diagnosing and/or resolving a user's technical problem and/or where it is advantageous to consider user sentiment during diagnostic plan generation (i.e., by including user sentiment in an augmented prompt generated by prompt modification module 126).

Sentiment analysis module 136 determines user sentiment by analyzing user-submitted prompts using a suitable computer-implemented machine-learning sentiment analysis model. Sentiment analysis module 136 can then provide analyzed user sentiment to chat service module 110 to be transmitted to a technical support agent (e.g., technical support agent 190) handling a user's technical support session (e.g., transmitting the sentiment information to chat client 188 of technical support agent device 180). Sentiment analysis module 136 can also optionally provide user sentiment information to prompt modification module 126, which can include the received user sentiment information in an augmented prompt provided to the machine-learning language model(s) of language generation module 130. Prompt modification module 126 can also include an instruction to the machine-learning language model(s) to consider the user sentiment information when generating the diagnostic plan.

Advantageously, providing user sentiment information to a technical support agent and/or including user sentiment information in an augmented prompt can improve user experience with the technical support session. For example, a technical support agent can use sentiment information to identify whether a user is in a generally positive or negative mood, and to tailor the user's support experience accordingly. As a specific example, if the user has a generally negative sentiment in an initial message provided via chat client 148, the technical support agent can avoid diagnostic questions or troubleshooting steps known to the technical support agent to be frustrating to users seeking technical assistance. User sentiment information can be used during language generation by language generation module 130 in substantially the same manner. For example, if a user's initial prompt or message has negative sentiment, language generation module 130 can generate a diagnostic plan that avoids troubleshooting steps that may be redundant with troubleshooting steps already performed by the user (as determined by the user's initial prompt), that does not include a large number of troubleshooting steps, and/or that otherwise is likely to produce a support experience that does not frustrate or otherwise degrade the user's technical support experience.

System 10 advantageously allows for the automated construction of diagnostic plans that can be used to diagnose user technical issues. The diagnostic plans generated by system 10 and, in particular, server 100 can be used to decrease the total amount of time required to solve user technical problems. The automatedly-generated diagnostic plans enabled by system 10 allow technical support agents to begin diagnosing and troubleshooting user technical problems without requiring those technical support agents to spend time cross-referencing technical information to generate diagnostic plan. Rather, server 100 automatedly generated diagnostic plan information based on initial user diagnostic information (e.g., symptoms of a technical problem) provided via chat client 148. Further, the diagnostic plans generated by system 10 and server 100 can reduce the technical experience required by technical support agents. That is, the diagnostic plans enabled by system 10 do not require technical support agents to have expertise in solving or diagnosing all technical problems. Rather, server 100 is able to query and reference diagnostic information stored to support database 160 in an automated manner and assemble relevant information into a diagnostic plan that can be directly provided to a technical support agent handling a user's technical support session.

Although technical support system 10 is depicted as including only one user device (i.e., user device 140) and one support technician device (i.e., technical support agent device 180), in other examples, technical support system 10 can include any number of user devices and support technician devices. FIG. 1 depicts only one user device and one support technician device for illustrative clarity and convenience, but server 100 can be connected to any suitable number of user devices and support technician devices. In some examples, technical support system 10 can also include any suitable system, such as a hunt group or an equivalent system, for assigning support technician devices to hybrid technical support sessions (i.e., for assigning a support technician to a particular user's hybrid technical support session).

Figure 2:
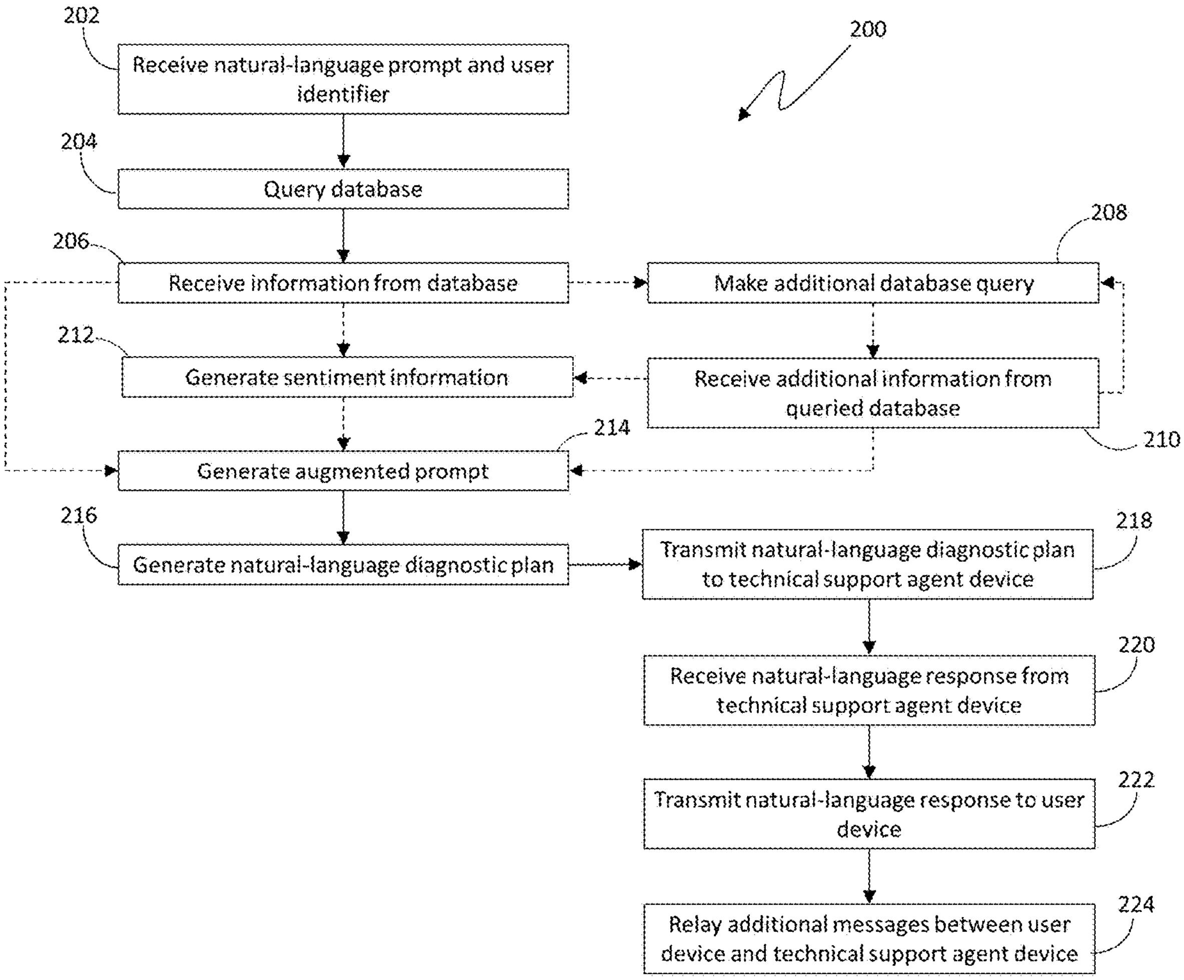
FIG. 2 is a flow diagram of an example of a method of automated diagnostic plan generation and of using diagnostic plans to diagnose user technical problems suitable for use by the system of FIG. 1.

FIG. 2 is a flow diagram of method 200, which is a flow diagram of a method of automatedly generating diagnostic plans for technical support and, in some examples, of diagnosing and/or resolving user technical issues. Method 200 includes steps 202-222 of receiving a natural-language prompt and a user identifier (step 202), querying a database (step 204), receiving information from the database (step 206), making an additional database query (step 208), receiving additional information from queried database (step 210), generating sentiment information (step 212), generating an augmented prompt (step 214), generating a natural-language diagnostic plan (step 216), transmitting the natural-language diagnostic plan to a technical support agent device (step 218), receiving a natural-language response from a technical support agent device, (step 220), transmitting the natural-language response to the user device (step 222), and relaying additional messages between the user device and the technical support agent device (step 224). Method 200 performable by server 100 of technical support system 10 and is described herein with reference to technical support system 10 (FIG. 1), but method 200 can be implemented in any suitable system to enable hybrid technical support according to the present disclosure.

In step 202, server 100 receives a user prompt and a user identifier from a user device, such as user device 140. The prompt is natural-language text (e.g., a text string) that includes a natural-language representation of one or more symptoms of a technical problem that the user is experiencing and, in some examples, can also include one or more user questions and/or additional statements describing and/or relating to the technical problem. In some examples, the user prompt can symptoms, questions, etc. relating to more than one technical problem. The prompt received in step 202 includes one or more symptoms of the technical issue and, in some examples, can also include various troubleshooting steps that the user has already A user can enter a message describing a technical problem the user is experiencing into a chat client configured to interact with and use functionality of server 100 (e.g., chat client 148), and the chat client can provide the message to server 100. The received message is the prompt received in step 202. Additionally and/or alternatively, server 100 can remove portions of the user message, such as extraneous filler words, and use the resulting natural-language text as the prompt.

The user identifier can be, for example, an account name, an access credential (e.g., a username), an account number, the user's personal name (e.g., a first and/or last name), etc. In some examples, a user can submit access credentials (e.g., a username, password, etc.) to the chat client and the chat client can verify that the user is approved to access server 100 functionality by validating the provided credentials with credentials stored to server 100. The chat client can store or retain an identifier for the user and can provide that identifier as the user identifier with prompts submitted by the user to server 100.

In step 204, server 100 queries support database 160 or user database 162. Query module 120 of server 100 generates a query using either the user identifier received in step 202 (i.e., for a query of user database 162) or the prompt received in step 202 (i.e., for a query of support database 160). Query module 120 then queries the relevant database (i.e., of support database 160 and user database 162) with the generated query. The query can be generated from the prompt by, as described previously in the discussion of query module 120 (FIG. 1), creating an embedding or other representation of the prompt (e.g., a vector embedding), and/or by extracting one or more keywords from the prompt. The keywords can be, for example, one or more intents and/or entities extracted using a natural-language processing algorithm.

In step 206, server 100 receives information from the database queried in step 204. The database queried in step 204 can transmit relevant data to server 100. The program(s) of query module 120 can provide the received information to the program(s) of prompt modification module 126 and/or can use the received information to generate additional queries (i.e., in subsequent step 208). The information received in step 206 can be, for example, one or more diagnostic templates (e.g., from support database 160) and/or user-specific information (e.g., from user database 162).

In step 208, query module 120 of server 100 makes an additional database query of either support database 160 or user database 162. In step 210, server 100 receives information from the database queried in step 208. Step 208 can be performed in substantially the same manner as step 204, and the description of step 204 is applicable to step 208. Similarly, step 210 can be performed in substantially the same manner as step 206, and the description of step 206 is applicable to step 210.

Steps 208-210 are optional and are performed where it is desirable to perform multiple queries of one or more databases (e.g., one or both of support database 160 and user database 162). For example, as described previously in the discussion of query module 120 (FIG. 1), it may be advantageous to first query user database 162 to retrieve user-specific information, such as a product recently purchased by the user, and to subsequently query support database 160 using the retrieved user-specific information. In those examples, user database 162 can be queried with the user identifier in step 206, the information received in step 208 is the user-specific information, the user-specific information can be used to query support database 160 in step 208, and the additional information received in step 210 can be a diagnostic template. As an additional example, query module 120 can make multiple queries of support database 160 using multiple keywords extracted from the prompt received in step 202.

As indicated by the arrows extending between step 208 and step 210 in FIG. 2, steps 208-210 can be repeated multiple times in examples where it is advantageous to make more than two queries of support database 160, user database 162, or any combination thereof. For example, query module 120 may extract or be configured to extract three or more keywords that can be used to query support database 160, and query module 120 can make three separate queries of query support database 160 (i.e., one with each extracted keyword). As an additional example, user database 162 can be queried to obtain user-specific information, the user-specific information can be used to query support database 160, and information from the user-submitted prompt can also be used to make one or more additional queries of support database 160 in additional iterations of steps 208-210. The additional queries can include queries based on keywords extracted from the user prompt received in step 202 or a query using a representation (e.g., a vector embedding) of the user prompt received in step 202.

In step 212, sentiment analysis module 136 analyzes user sentiment in the prompt received in step 202. Step 212 is an optional step of method 200 and is performed in examples where it is advantageous to provide user sentiment to a technical support agent and/or to user include user sentiment in the augmented prompt used for language generation. In step 212, sentiment analysis module 136 analyzes user sentiment using a machine-learning sentiment analysis model. The machine-learning sentiment analysis model can be of any suitable type of analyzing sentiment in text and can be configured to label user sentiment according to any suitable categories and any suitable number of categories. The machine-learning sentiment analysis model can, for example, classify user sentiment according to the positivity of user sentiment, such as by classifying user sentiment as "positive" or "negative." The machine-learning sentiment analysis model can also, for example, classify user sentiment into discrete categories reflecting predicted user mood, attitude, mental state, etc. Sentiment analysis module 136 can provide predicted user sentiment to chat service module 110 (e.g., if providing user sentiment directly to a technical support agent) and/or to prompt modification module 126 (e.g., if user sentiment is to be used for diagnostic plan generation). Sentiment analysis module 136 or another program of server 100 can be configured to provide sentiment information as natural-language text representative of predicted user sentiment.

In step 214, an augmented prompt is generated. Prompt modification module 126 generates the augmented prompt based on the natural-language prompt received in step 202 and the database information received in step 206, and optionally also based on the database information received in step 210 and/or the sentiment information generated in step 212 in examples including step 210 and/or step 212, respectively. Prompt modification module 126 can generate the augmented prompt by, for example, combining the natural-language text of the prompt received in step 202 with natural-language text received in step 206 and, optionally, in step 210 and/or step 212. In some examples, prompt modification module 126 can include one or more machine-learning language models configured to summarize natural-language text, and can generate the augmented prompt by first combining the natural-language text received in steps 202 and 206, and optionally in steps 210 and/or 212, and subsequently summarizing the combined natural-language text. In some examples, prompt modification module 126 can include an instruction usable by the machine-learning language model(s) used in subsequent step 216 to generate a diagnostic plan based on the other natural-language text of the augmented prompt.

As steps 208-212 are optional, method 200 can proceed in several ways following step 206. In examples lacking steps

208-212, method 200 proceeds directly from step 206 to step 214. In examples lacking step 212 but including steps 208-210, method 200 proceeds to step 208 from step 206 and to step 210 from step 208. Steps 208-210 can be performed for any suitable number of iterations (including a single iteration) and method 200 then proceeds directly to step 214 from the final iteration of step 210. In examples lacking steps 208-210 but including step 212, method 200 can proceed directly to step 212 from step 206 and subsequently can proceed from step 212 to step 214.

Following step 214, method 200 proceeds to step 216. In step 216, language generation module 130 generates a diagnostic plan based on the augmented prompt generated in step 214. Prompt modification module 126 provides the augmented prompt generated in step 214 to language generation module 130, which in turn provides the augmented prompt as an input to a machine-learning language model. The machine-learning language model can be, as described in the discussion of language generation module 130 previously (FIG. 1), a large language model and/or a transformer model. In some examples, the language model is a general-purpose language model that is not specifically trained or fine-tuned and configured to produce a wide range of natural-language outputs. In these examples, the augmented prompt generated in step 214 can include specific directions or instructions to generate a diagnostic plan. In other examples, the language model can be general-purpose language models with additional training for generating a diagnostic plan using a model fine-tuning approach (e.g., a transfer learning approach). In these examples, the machine-learning language model may be able to generate a diagnostic plan from an augmented prompt that does not include specific instructions to generate a diagnostic plan.

As described previously in the discussion of language generation module 130 (FIG. 1), each diagnostic plan generated in step 214 can take any suitable form, structure, etc. to outline a strategy and/or identify one or more actions by which a technical support agent (e.g., technical support agent 190) can diagnose and, in some examples, resolve or attempt to resolve the user technical issue(s) outlined in the user message used to generate the diagnostic plan. The diagnostic plan generated in step 214 can be a checklist of troubleshooting tasks, an ordered series of questions and descriptions of likely technical issues corresponding to expected answers to the questions, and/o a branching decision tree with instructions as to troubleshooting tasks and/or questions for the user that can be followed by a technical support agent to diagnose and/or resolve the user's technical issue(s). The form, structure, etc. of the diagnostic plans can be determined by, for example, the templates retrieved by query module 120 and/or according to the parameters, hyperparameters, etc. of the machine-learning language model. Where more than one diagnostic template is received during method 200 (i.e., in examples where method 200 includes one or more iterations of steps 208-210), the diagnostic plan generated in step 216 can synthesize information from the templates into a single diagnostic plan and, further, can rank or prioritize individual troubleshooting and/or diagnostic steps according to the user prompt received in step 202.

In step 218, the natural-language diagnostic plan generated in step 216 is transmitted to the technical support agent device. Steps 218 is optional and is performed in examples where the natural-language diagnostic plan is used by a technical support agent to diagnose and/or resolve the user's technical issue outlined in the prompt received in step 202. The diagnostic plan is transmitted from server 100 to the support technician device (e.g., technical support agent device 180) via network 170. Chat client 188 of technical support agent device 180 can communicate the diagnostic plan by, for example, displaying the diagnostic plan as natural-language text or a representation thereof via user interface 186.

In step 220, server 100 receives a natural-language response from the technical support agent device. Technical support agent device 180 can receive one or more inputs from the technical support agent (e.g., technical support agent 190) via user interface 186 for chat client 188 corresponding to natural-language text intended for the user from whom the prompt was received in step 202 (i.e., the user to whom the user identifier received in step 202 corresponds). Chat client 188 can transmit the natural-language text (or an indication thereof) to server 100 via network 170 and chat service module 110 can receive the natural-language text (or an indication thereof). The natural-language response is formulated based on the diagnostic plan generated in step 216 and transmitted in step 218.

In step 222, server 100 transmits the natural-language response received in step 220 to user device 140. Chat service module 110 can cause server 100 to transmit the natural-language response to user device 140 and chat client 148 can communicate the natural-language response to the user of user device 140 (e.g., user 150). Steps 220-222 are also optional and are performed in examples where it is advantageous for a user to receive a message via the chat service operated by chat service module 110 in response to the prompt or message received in step 202.

In step 224, server 100 relays additional messages between user device 140 and technical support agent device 180. Additional messages can be sent by the user via chat client 148 and by the technical support agent via chat client 188. More specifically, user messages sent via chat client 148 can be received by chat service module 110 of server 100 via network 170 and transmitted via network 170 to technical support agent device 180 and can be communicated to the technical support agent via chat client 188. Technical support agent messages sent via chat client 188 can be received by chat service module 110 of server 100 via network 170 and transmitted via network 170 to user device 140 and can be communicated to the user via chat client 148. The additional messages sent in step 224 can constitute the remainder of the technical support session and can include additional diagnostic questions or statements sent by the technical support agent, additional troubleshooting steps suggested by the technical support agent, and/or additional responsive messages sent by the user, among other options.

Advantageously, method 200 enables the automated generation of diagnostic plans that can be used to diagnose user technical issues, including the automated generation of complex diagnostic plans that synthesize and incorporate multiple diagnostic and/or troubleshooting strategies. Notably, method 200 decreases the total amount of time required to solve user technical problems by a human technical support agent and, further, reduces technical training required for technical support agents to accurately and efficiently diagnose and/or resolve user technical problems. Method 200 advantageously enables a server, such as server 100, to query and reference diagnostic information stored to support database 160 in an automated manner and assemble relevant information into a diagnostic plan that can be followed by a technical support agent handling a user's technical support session to efficiently and accurately diagnose and/or solve the user's technical problem(s). Furthermore, in some embodiments method 200 can advantageously improve user experience with technical support by providing sentiment information to the technical support agent handling a user's technical problem and/or by creating a diagnostic plan based partially on the user's predicted sentiment (e.g., mood, state of mind, etc.).

Figure 3:
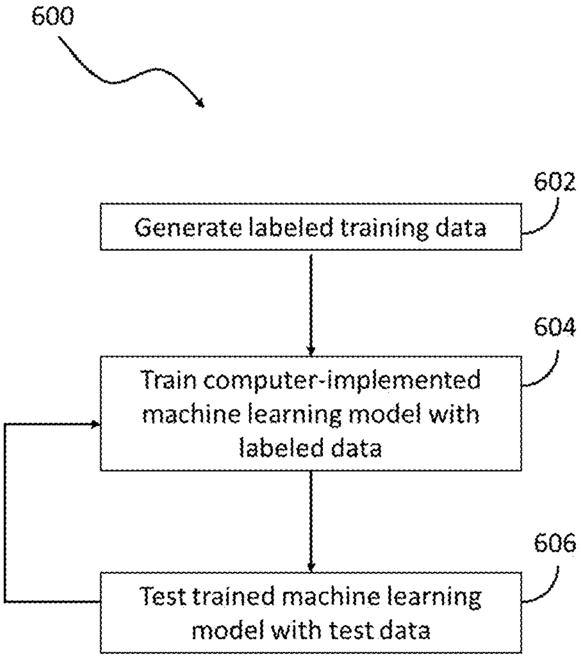
FIG. 3 is a flow diagram of an example of a method of training a computer-implemented machine-learning model suitable for use by the system FIG. 1 and with the method of FIG. 2.

FIG. 3 is a flow diagram of method 600, which is a method of fine-tuning or training a computer-implemented machine-learning model for use by server 100 (FIG. 1) and/or with method 200 (FIG. 2). Method 600 can be used to train or fine-tune a machine-learning language model for use by language generation module 130 and/or to train a sentiment analysis model used by sentiment analysis module 136. Machine-learning language models trained according to method 600 are capable of accepting as natural-language text and/or representations thereof describing as inputs and generating natural-language diagnostic plans as outputs. Machine-learning sentiment analysis models trained according to method 600 are able to generate predicted sentiment information based on natural-language text inputs (or inputs that are representations, such as embeddings, of natural-language text). Method 600 includes steps of 602-606 of generating a training dataset (step 602), fine-tuning or training a machine-learning model with the training dataset (step 604), and testing the fine-tuned or trained machine-learning model with test data (step 606). Method 600 is described herein with respect to server 100 (FIG. 1), but method 600 can be performed by any suitable computing device and the models fine-tuned or trained using method 600 can be used by server 100 to perform method 200 (FIG. 2) as described herein.

In step 602, training data is generated. The training data is labeled according to the purpose for which the computer-implemented machine learning model is being trained. For example, if method 600 is being used to train a machine-learning model for sentiment analysis of natural-language text, the training data can be natural-language text segments and each natural-language text segment can be labeled with a value or text phrase describing the sentiment of the natural-language text segment. As an additional example, if method 600 is being used to fine-tune or train a computer-implemented machine-learning language model to generate diagnostic plans based on natural-language text inputs, the training data can be pairs of text inputs and corresponding diagnostic plan outputs (i.e., such that each input is "labeled" with a natural-language diagnostic plan output).

In step 604, the labeled data is used to fine-tune or train a general-purpose machine-learning language model to generate a specialized machine-learning language model, or to train another suitable machine-learning model (e.g. a machine-learning sentiment analysis model). As used herein, "fine-tuning" a computer-implemented machine-learning model refers to any process by which a subset (i.e., less than all) parameters, hyper parameters, biases, weights, and/or any other value related to model accuracy are adjusted to improve the fit of the computer-implemented machine-learning model to the training data. Fine-tuning is typically performed using a pre-trained model and leverages the prior training of the model for a new application, task, etc. As used herein, "training" a computer-implemented machine-learning model refers to any process by which all or substantially all parameters, hyper parameters, biases, weights, and/or any other value related to model accuracy are adjusted to improve the fit of the computer-implemented machine learning model to the training data.

In step 606, the trained computer-implemented machine learning model is tested with test data. The test data used in step 606 is data specialized dataset used to train the computer-implemented machine-learning model in step 604 and is used to qualify and/or quantify performance of the trained or fine-tuned machine-learning model. In some examples, the test data used in step 606 can be a subset of the specialized dataset generated in step 602 that is not used for training in step 604. A human or machine operator can evaluate the performance of the trained or fine-tuned model by evaluating the fit of the model to the test data. The operator can, for example, evaluate the fit of a trained or fine-tuned machine-learning language model by evaluating the relevance, structure, format, etc. of diagnostic plan outputs of generated based on various prompts that include sample technical questions, technical problem symptom descriptions, etc.

As depicted in FIG. 4, steps 604 and 606 can be performed iteratively to improve the performance of the machine learning model. More specifically, if the fit of the model determined in step 606 is undesirable (i.e., the fit of the model to the test data), step 604 can be repeated to further adjust the parameters, hyper parameters, biases, weights, etc. of the model to improve and adjust the fit of the model. Step 604 can be repeated using the same specialized dataset (or portion thereof) used in a previous iteration of step 604 or can be repeated using new training data of substantially the same kind as forms the specialized dataset. Step 606 can then be repeated with a new set of unlabeled test data or the same set of test data to determine how the adjusted model fits the new set of unlabeled test data. If the fit continues to be undesirable, further iterations of steps 604 and 606 can be performed until the fit of the model becomes desirable.

Discussion of Possible Embodiments

The following are non-exclusive descriptions of possible embodiments of the present invention.

A method of automated diagnostic plan generation, the method comprising: receiving, by a processor of a network-connected device, a natural-language prompt from a user device and a user identifier corresponding to the user, the natural-language prompt including a natural-language description of a symptom of a technical problem; querying a first database with a first query comprising at least one of the user identifier, a representation of the natural-language prompt, and at least one keyword extracted from the natural-language prompt; receiving first information from the first database in response to the first query; generating an augmented prompt based on the natural-language prompt and the first information; generating, by a language model executed by the processor, a natural-language diagnostic plan based on the augmented prompt, the natural-language diagnostic plan comprising a plurality of diagnostic steps for diagnosing the technical problem; and transmitting the natural-language diagnostic plan to a technical support agent device in electronic communication with the user device.

The method of the preceding paragraph can optionally include, additionally and/or alternatively, any one or more of the following features, configurations and/or additional components:

A further embodiment of the foregoing method, wherein receiving, by the processor, the natural-language prompt and the user identifier comprises: receiving, by a chat client operated by a user device in electronic communication with the network-connected device, a natural-language text input from the user including the natural-language prompt; generating, by the user device, a request comprising the natural-language prompt and the user identifier; providing, by the user device, the request to the network-connected device; and extracting, by the processor, the user identifier and the natural-language prompt from the request.

A further embodiment of the foregoing method, wherein querying the first database with the at least one of the user identifier, a representation of the natural-language prompt, and at least one keyword extracted from the natural-language prompt comprises querying the first database with the user identifier to retrieve product information for a technical product purchased by the user.

A further embodiment of the foregoing method, further comprising querying a second database with the product information to receive natural-language diagnostic information for diagnosing common technical problems for the technical product, and wherein generating the augmented prompt based on the natural-language prompt and the first information comprises generating the augmented prompt by combining the natural-language prompt and the natural-language diagnostic information.

A further embodiment of the foregoing method, wherein: querying the first database the at least one of the user identifier, a representation of the natural-language prompt, and at least one keyword extracted from the natural-language prompt comprises querying the first database using the representation of the natural-language prompt; the representation of the natural-language prompt is a vector representation of the natural-language prompt; and the first database is a vector database storing a plurality of vectors representative of a plurality of natural-language text segments.

A further embodiment of the foregoing method, wherein the first information comprises at least one diagnostic template comprising at least a portion of the plurality of diagnostic steps.

A further embodiment of the foregoing method, wherein querying the first database the at least one of the user identifier, a representation of the natural-language prompt, and at least one keyword extracted from the natural-language prompt comprises: extracting the at least one keyword from the natural-language prompt; and querying the first database with the at least one keyword extracted from the natural-language prompt.

A further embodiment of the foregoing method, wherein extracting the at least one keyword from the natural-language prompt comprises extracting, using a natural-language processing algorithm executed by the processor, an intent and an entity from the natural-language prompt.

A further embodiment of the foregoing method, wherein the first database organizes data into a plurality of data subsets and wherein querying the first database comprises: selecting a subset of the plurality of data subsets using at least one of the intent and the entity; and querying the subset of data using the other of the intent and the entity to retrieve the first information.

A further embodiment of the foregoing method, wherein the first information comprises at least one diagnostic template comprising at least a portion of the plurality of diagnostic steps.

A further embodiment of the foregoing method, wherein the at least one keyword comprises a first keyword and a second keyword, and wherein querying the first database with the at least one keyword comprises: querying the first database with the first keyword to retrieve the first information; and querying the first database with the second keyword to retrieve second information.

A further embodiment of the foregoing method, wherein generating the augmented prompt comprises generating the augmented prompt based on the natural-language prompt, the first information, and the second information.

A further embodiment of the foregoing method, wherein the first information comprises natural-language text and wherein generating the augmented prompt based on the natural-language prompt and the first information comprises combining the natural-language prompt with the natural-language text.

A further embodiment of the foregoing method, further comprising generating user sentiment information based on the natural-language text prompt, and wherein generating the augmented prompt comprises generating the augmented prompt based on the natural-language prompt, the first information, and the user sentiment information.

A further embodiment of the foregoing method, wherein generating user sentiment information comprises classifying user sentiment using a computer-implemented machine-learning sentiment classification algorithm executed by the processor.

A further embodiment of the foregoing method, further comprising receiving, by the network-connected device, a natural-language response from the technical support agent device after communicating the natural-language diagnostic plan.

A further embodiment of the foregoing method, further comprising transmitting the natural-language response from the network-connected device to the user device.

A system for technical support, the system comprising: a user device electronically-connected to a network; a technical support agent device electronically-connected to the network; a database electronically-connected to the network; and a server electronically-connected to the network, the server comprising: a processor; and at least one memory encoded with instructions that, when executed, cause the processor to: receive a natural-language prompt from the user device and a user identifier corresponding to the user, the natural-language prompt including a natural-language description of a symptom of a technical problem; query the database with a first query comprising at least one of the user identifier, a representation of the natural-language prompt, and at least one keyword extracted from the natural-language prompt; receive information from the first database in response to the first query; generate, using a machine-learning language model, a natural-language diagnostic plan based on the augmented prompt, the natural-language diagnostic plan comprising a plurality of diagnostic steps for diagnosing the technical problem; and transmit the natural-language diagnostic plan to a technical support agent device in electronic communication with the user device.

The system of the preceding paragraph can optionally include, additionally and/or alternatively, any one or more of the following features, configurations and/or additional components:

A further embodiment of the foregoing system, wherein the information comprises at least one diagnostic template comprising at least a portion of the plurality of diagnostic steps.

A further embodiment of the foregoing system, wherein the instructions, when executed, further cause the processor to generate user sentiment information based on the natural-language text prompt, and to generate the augmented prompt based on the natural-language prompt, the first information, and the user sentiment information.

SUMMATION

Any relative terms or terms of degree used herein, such as "substantially", "essentially", "generally", "approximately"

and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

The invention claimed is:

1. A method of automated diagnostic plan generation, the method comprising:
   - receiving, by a first chat client running on a network-connected client device, a natural-language prompt from a user and a user identifier corresponding to the user, the natural-language prompt including a natural-language description of a symptom of a technical problem;
   - transmitting, by the first chat client and to a network-connected host device, a first request to invoke a host service exposed by an application programming interface of the network-connected host device, the first request including the natural-language prompt and the user identifier;
   - receiving, by the network-connected host device, the transmitted request via a network connecting the network-connected client device and the network-connected host device;
   - responsive to receiving the transmitted request:
     - extracting, by the host service, the user identifier and the natural-language prompt from the request;
     - executing, by the host service, a natural-language processing algorithm to extract an intent and an entity from the natural-language prompt;
     - querying, by the host service, a first database with a first query comprising the intent and the entity, wherein the first database organizes data into a plurality of data subsets and wherein querying the first database comprises:
       - selecting a subset of the plurality of data subsets using at least one of the intent and the entity; and
       - querying the subset of data using the other of the intent and the entity to retrieve first information comprising at least one diagnostic template, wherein the at least one diagnostic template comprises a set of diagnostic steps;
     - receiving, by the host service, the first information from the first database in response to the first query;
     - generating user sentiment information by classifying user sentiment using a computer-implemented machine-learning sentiment classification algorithm executed by the host service;
     - generating, by the host service, an augmented prompt based on the natural-language prompt, the first information, and the user sentiment information;
     - providing, by the host service, the augmented prompt as an input to a language model;
     - generating, by the language model, a natural-language diagnostic plan based on the augmented prompt, the natural-language diagnostic plan comprising a plurality of diagnostic steps for diagnosing the technical problem, wherein the plurality of diagnostic steps includes the set of diagnostic steps from the diagnostic template; and
     - transmitting, by the host-service, the natural-language diagnostic plan to a technical support agent device in electronic communication with the user device;
   - receiving, by second chat client running on the technical support agent device, the natural-language diagnostic plan;
   - displaying, by the second chat client and via a display of the technical support agent device, the natural-language diagnostic plan;
   - receiving, by the second chat client, a natural-language technical support response via a user input device of the technical support agent device;
   - transmitting, by the second chat client and to the network-connected host device, a second request to invoke the host service, the second request including the natural-language technical support response; and
   - transmitting, by the host service and responsive to the second request, the natural-language technical support response to the client device.

2. The method of claim 1, wherein querying the first database with the at least one of the user identifier, a representation of the natural-language prompt, and at least one keyword extracted from the natural-language prompt comprises querying the first database with the user identifier to retrieve product information for a technical product purchased by the user.

3. The method of claim 2, and further comprising querying a second database with the product information to receive natural-language diagnostic information for diagnosing common technical problems for the technical product, and wherein generating the augmented prompt based on the natural-language prompt and the first information comprises generating the augmented prompt by combining the natural-language prompt and the natural-language diagnostic information.

4. The method of claim 1, wherein: querying the first database the at least one of the user identifier, a representation of the natural-language prompt, and at least one keyword extracted from the natural-language prompt comprises querying the first database using the representation of the natural-language prompt; the representation of the natural-language prompt is a vector representation of the natural-language prompt; and the first database is a vector database storing a plurality of vectors representative of a plurality of natural-language text segments.

5. The method of claim 4, wherein the first information comprises at least one diagnostic template comprising at least a portion of the plurality of diagnostic steps.

6. The method of claim 1, wherein the at least one keyword comprises a first keyword and a second keyword, and wherein querying the first database with the at least one keyword comprises:
   - querying the first database with the first keyword to retrieve the first information; and
   - querying the first database with the second keyword to retrieve second information.

7. The method of claim 6, wherein generating the augmented prompt comprises generating the augmented prompt based on the natural-language prompt, the first information, and the second information.

8. The method of claim 1, wherein the first information comprises natural-language text and wherein generating the augmented prompt based on the natural-language prompt and the first information comprises combining the natural-language prompt with the natural-language text.

9. A system for technical support, the system comprising:
a user device electronically-connected to a network, the user device comprising:
a first processor; and
at least one first memory encoded with first instructions;
a technical support agent device electronically-connected to the network, the technical support agent device comprising:
a user input device
a second processor; and
at least one second memory encoded with second instructions;
a database electronically-connected to the network; and
a server electronically-connected to the network, the server comprising:
a third processor; and
at least one third memory encoded with third instructions that, when executed, cause the third processor to:
in response to receiving a first request from the user device to invoke a host service running on the server:
extract a user identifier and a natural-language prompt from the request;
execute a natural-language processing algorithm to extract an intent and an entity from the natural-language prompt;
query the database with a first query comprising the intent and the entity by:
selecting a subset of the plurality of data subsets using at least one of the intent and the entity; and
querying the subset of data using the other of the intent and the entity to retrieve first information comprising at least one diagnostic template, wherein the at least one diagnostic template comprises a set of diagnostic steps;
receive information from the first database in response to the first query;
generate user sentiment information by classifying user sentiment using a computer-implemented machine-learning sentiment classification algorithm executed by the host service;
generate an augmented prompt based on the natural-language prompt, the first information, and the user sentiment information;
generate, using a machine-learning language model, a natural-language diagnostic plan based on the augmented prompt, the natural-language diagnostic plan comprising a plurality of diagnostic steps for diagnosing the technical problem, wherein the plurality of diagnostic steps includes the set of diagnostic steps from the diagnostic template; and
transmit the natural-language diagnostic plan to the technical support agent device in electronic communication with the user device; and
in response to receiving a second request from the technical support agent device to invoke the host, transmit a natural-language technical support response to the client device;
wherein the first instructions, when executed, cause the first processor to:
receive, via a first chat client running on the user device, a natural-language prompt from the user device and a user identifier corresponding to the user, the natural-language prompt including a natural-language description of a symptom of a technical problem; and
transmitting, to the server, the first request to invoke the host service of the server, the request including the natural-language prompt and the user identifier; and
wherein the second instructions, when executed, cause the second processor to:
receive, by a second chat client running on the technical support agent device, the natural-language diagnostic plan from the server;
display the natural-language diagnostic plan;
receive the natural-language technical support response via the user input device; and
transmit the second request to invoke the host service, the second request including the natural-language technical support response.

* * * * *